United States Patent [19]

Onneweer

[11] Patent Number: 5,346,105
[45] Date of Patent: Sep. 13, 1994

[54] DISPENSER FOR GRANULAR MATERIAL

[75] Inventor: Frederik J. Onneweer, Tervuren, Belgium

[73] Assignee: Dart Industries Inc., Deerfield, Ill.

[21] Appl. No.: 176,569

[22] Filed: Dec. 30, 1993

[51] Int. Cl.$^5$ .............................................. G01F 11/26
[52] U.S. Cl. ..................................... 222/455; 222/499
[58] Field of Search ............... 222/454, 455, 456, 499, 222/527, 570

[56] References Cited

U.S. PATENT DOCUMENTS

| | | |
|---|---|---|
| 1,220,689 | 3/1917 | Sanderson . |
| 1,297,244 | 3/1919 | Rauen . |
| 2,091,929 | 5/1937 | Kappenberg . |
| 2,269,876 | 4/1940 | Jensen . |
| 2,704,623 | 7/1950 | Yasso . |
| 3,129,859 | 4/1964 | Chappell . |
| 3,224,652 | 5/1964 | Ladwig et al. . |
| 3,836,055 | 9/1974 | Katzmark et al. . |
| 3,874,567 | 4/1975 | Collie .................................. 222/499 |
| 4,424,921 | 1/1984 | Feuerstein et al. . |
| 4,778,087 | 10/1988 | Desai . |
| 4,811,871 | 3/1989 | Wass et al. . |
| 5,064,106 | 11/1991 | Butler et al. . |

Primary Examiner—Gregory L. Huson
Attorney, Agent, or Firm—John A. Doninger

[57] ABSTRACT

A dispenser including a dispenser assembly having a dosing cup mounted within the open mouth of a container with a dispensing spout mounted thereabove and, through a flexible membrane, selectively positioned within the cup to receive a measured dose therefrom, and outwardly removed from the cup to receive a free flow of material therethrough from the container.

16 Claims, 4 Drawing Sheets

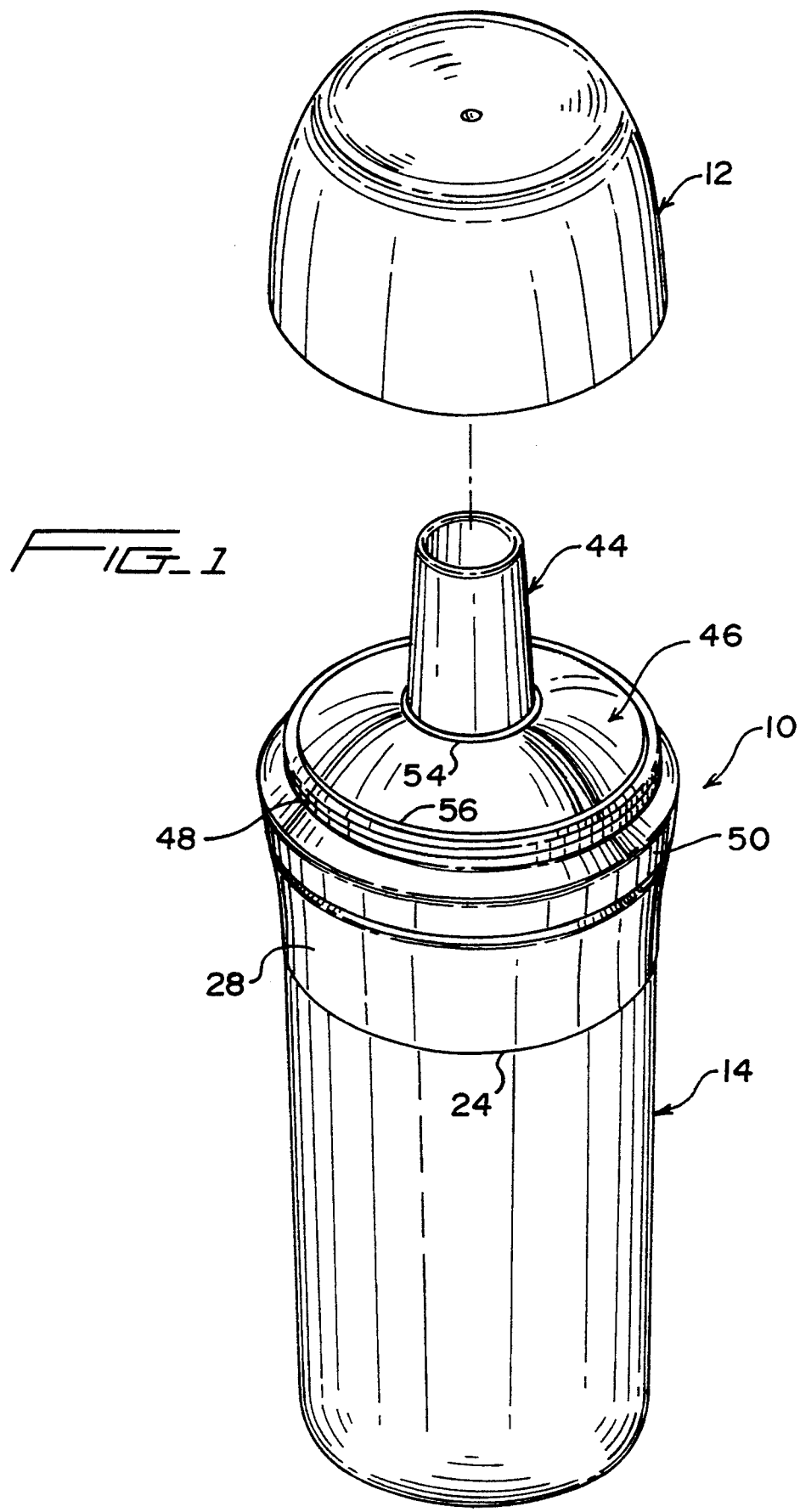

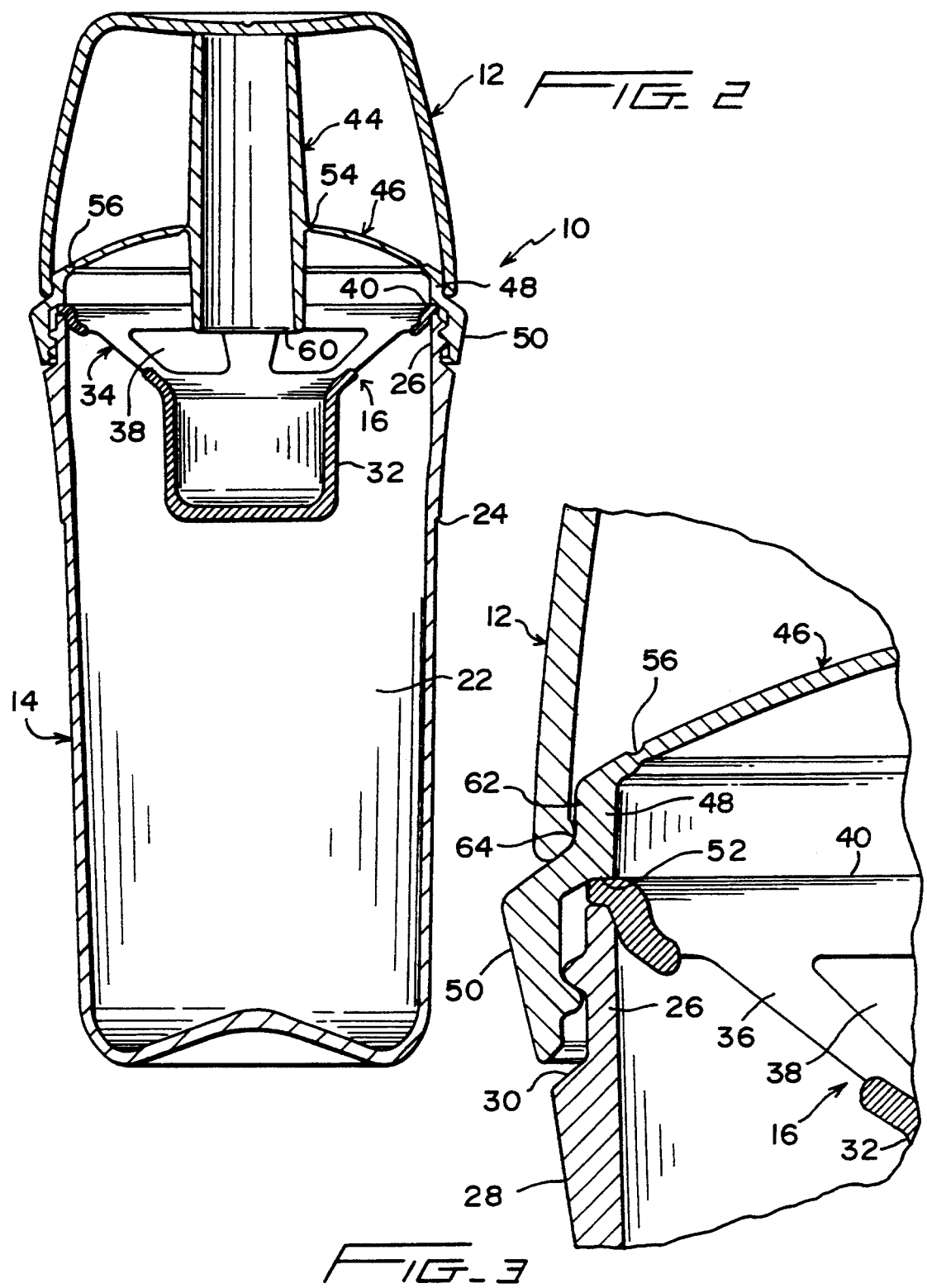

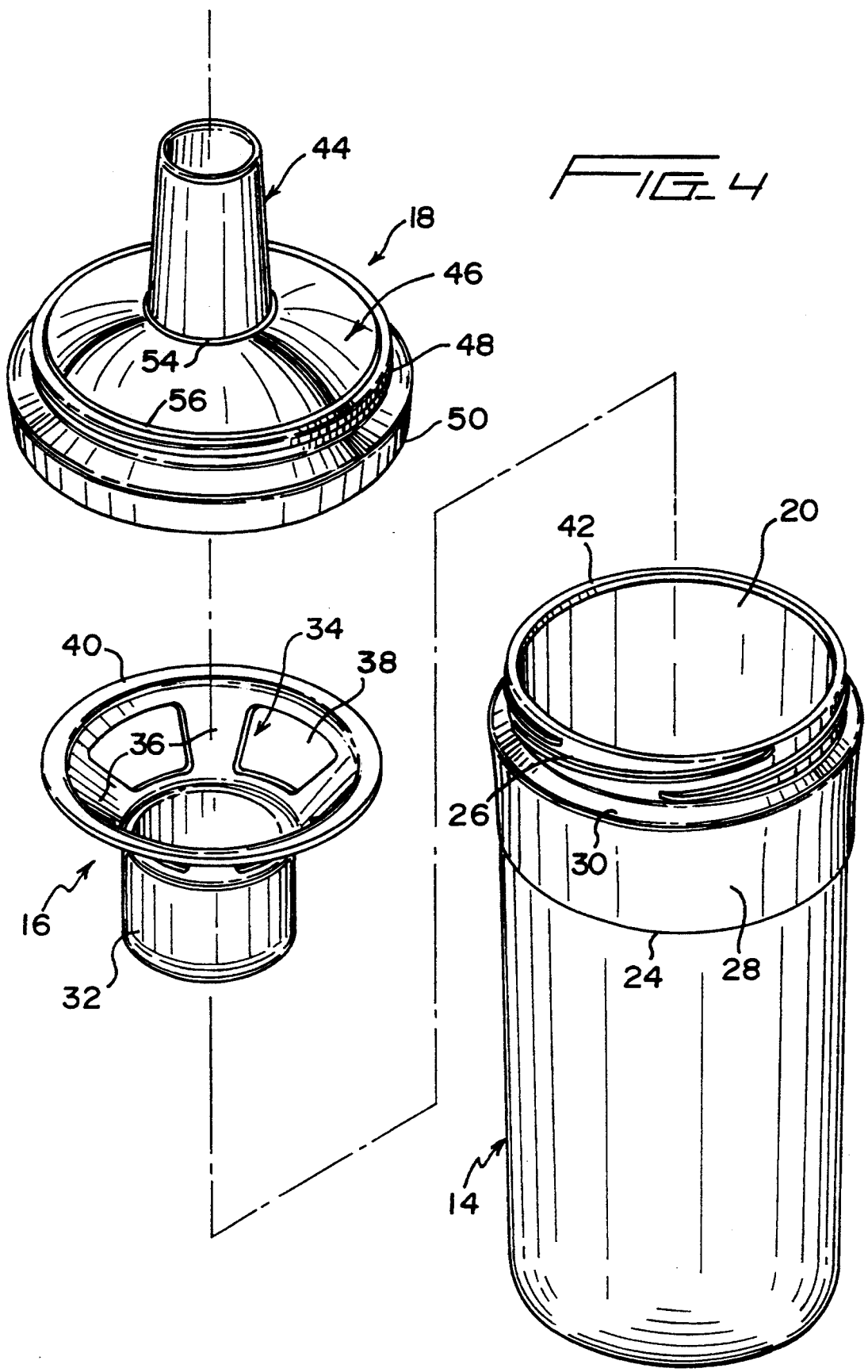

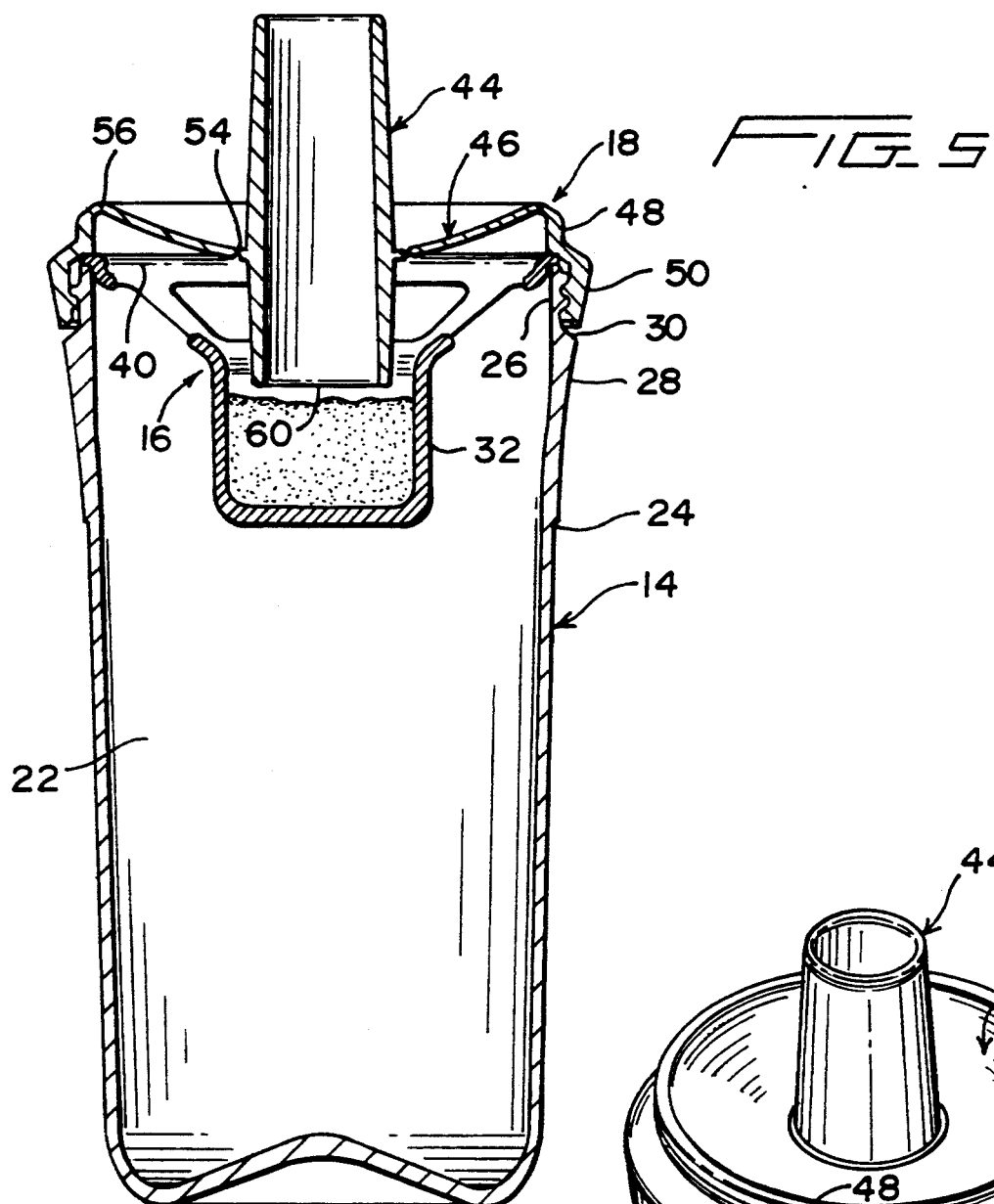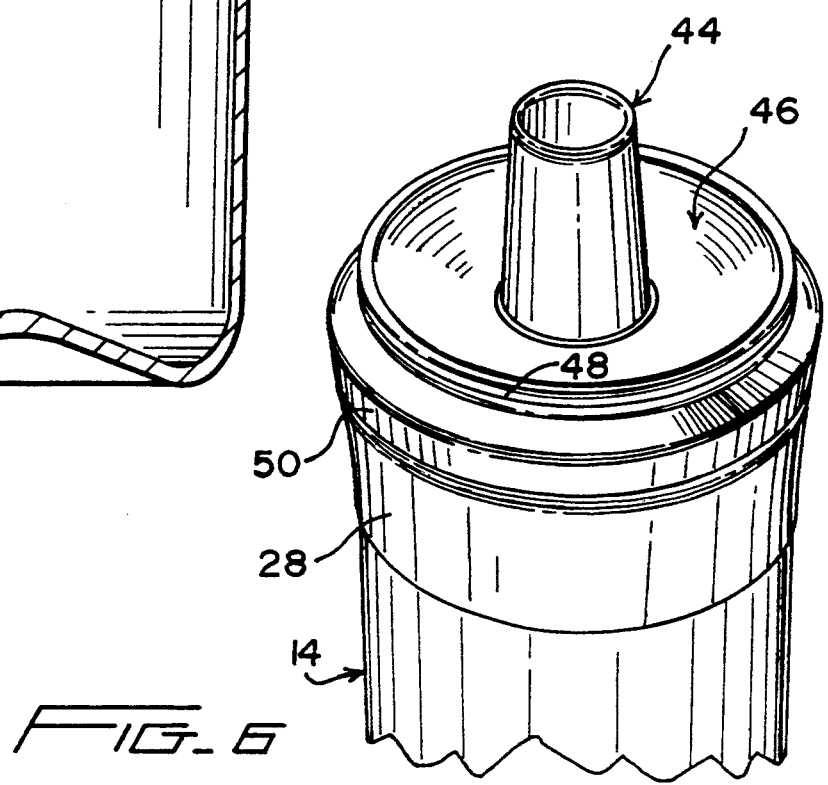

DISPENSER FOR GRANULAR MATERIAL

BACKGROUND OF THE INVENTION

Granular foodstuffs, for example, sugar, are commonly provided within a container with an appropriate pouring or dispensing spout. The basic container normally provides for an uncontrolled pouring of the contents through the spout with any controlling of the dose requiring the utilization of a separate utensil, such as a measuring cup, a spoon or the like. Should a large quantity of material be required, the uncontrolled or free-pouring dispensing is of course a highly desirable feature.

By the same token, and particularly as consumers become more health conscious and wish to control the amount of a specific foodstuff or condiment used, it has become desirable to provide containers with a means incorporated therein or mounted thereto which allows for the dispensing of a selected dose.

While it is not unknown for dispensers to incorporate the capability of dispensing measured amounts and, upon adjustment provide for free pouring, such dispensers are rather awkward or not readily convertible, requiring, as an example, forcing a dispensing tube through the condiment to be dispensed, or requiring an actual removal of the measuring insert. As such, the known dispensers do not readily adapt for more universal use, for example in a restaurant setting or the like.

SUMMARY OF THE INVENTION

The dispenser of the present invention provides, through a simple manual adjustment, either a continuous pour or the dispensing of a measured dose, doing so without necessitating an opening of the dispenser, the removal or an addition of a component thereto, or for that matter anything more complex than a simple push-pull manipulation of the dispensing spout itself.

The dispenser of the invention, used as desired as a sugar dispenser or the like, is easy to use, easy to pour, easy to fill and maintains the contents free from moisture and dust.

The dispenser, while equally usable for any number of granular or powdery materials, will, for purposes of description, hereinafter be generally referred to as a sugar dispenser and, in the nature of a conventional sugar dispenser, comprises an elongate body defining an internal storage chamber open at one end to receive a pouring or dispensing spout mounted to a cap threaded to the container.

The dispenser of the invention differs from the conventional sugar dispenser or the like by incorporating a separately mounted dosing insert which is mounted with the upper end of the storage chamber and secured in position by the spout cap. The insert includes a measuring cup inward of and aligned with the inner end of the spout. The spout or nozzle in turn, differing from the conventional spout, mounts by means of a flexible membrane for selective longitudinal movement relative to the measuring cup between a first dosing position wherein the inner end of the spout is below the upper end of the measuring cup and adapted to receive the sugar or the like solely from the measuring cup, and a second continuous pour position wherein the inner end of the spout is spaced above the measuring cup and in free flowing communication with the storage chamber for continuous pouring. The dispenser is completed by a closure or overcap frictionally engaged over the spout cap and providing a seal for the spout in either of the adjusted positions thereof.

The flexible membrane which mounts the spout is relatively stiff and, through concentric hinge portions both at the spout and at the outer mounting collar, snaps into and is retained within an overcenter position in both the free pour position and the dosing position. The dosing or measuring cup is retained in spaced relation below the top of the container by a "spider" support system which allows for free passage of the sugar either into the dosing cup or for free flow through the spout.

Other features and advantages of the invention will become more apparent from the detailed description thereof following hereinafter.

BRIEF DESCRIPTION OF THE DRAWINGS

FIG. 1 is a perspective view of the dispenser of the invention with the overcap exploded therefrom;

FIG. 2 is a vertical cross-sectional view through the dispenser with the overcap mounted and the spout in the continuous pour position;

FIG. 3 is an enlarged cross-sectional detail illustrating the mounted relationship between the measuring cup insert, the spout cap and the overcap on the container;

FIG. 4 is an exploded perspective view of the container and dispensing components;

FIG. 5 is a vertical cross-sectional view with the overcap removed and the spout in the dosing position; and FIG. 6 is a perspective view of the upper portion of the container with the spout in the dosing position.

DESCRIPTION OF PREFERRED EMBODIMENT

Referring now more specifically to the drawings, the dispenser 10 includes three basic components plus an overcap 12.

The components include a container 14, a dosing insert 16 and a spout cap 18.

The container 14, as illustrated, may be in the shape of a standard sugar dispenser, that is of vertically elongate cylindrical construction with an open mouth 20 to the interior storage chamber 22 defined therein. The container is preferably of clear polycarbonate or the like to enable a ready determination of the supply of pourable material remaining therein. The surface may have a finely etched finish to avoid scratches and include an indicator 24 of the maximum filling level. Such indicator can be an edge defined by the etched finish, a minor shoulder, or the like.

The top of the container, about the open mouth, is provided with an externally threaded neck 26 with the container, from the maximum fill line 24, having the outer surface thereof, as at 28, flaring slightly outward and upward to define a shoulder 30 at the base of the threaded neck 26.

The dosing insert 16 comprises a central dosing cup 32, of any practical size, but preferably, for sugar, holding approximately 3 grams or the equivalent of a standard sugar cube. The top of the cup 32 flares slightly outward to form a discharge mouth and is integrally formed with an openwork support or spider 34 which consists of upwardly and outwardly flaring ribs 36 peripherally spaced about the cup and defining a series of rather large free access openings 38. The support or spider 34 terminates in an integral annular outer support lip 40 which is laterally directed to overlie the lip 42 which defines the container mouth 20 peripherally thereabout with the cup 32 centrally positioned within the container. As will be appreciated from the drawings, the cup is retained within the upper portion of the container with the bottom of the cup at approximately the maximum fill level of the container.

The spout or nozzle cap 18 includes a central vertically elongate spout or nozzle 44 extending coaxially through and integrally joined to a circular or disk-like flexible membrane 46 with the spout 44 extending both above and below the membrane for an appreciable distance, preferably slightly greater above the membrane.

The outer periphery of the membrane 46 is integrally formed with an outer depending peripheral collar 48. The collar 48, about the lower periphery thereof, is integrally formed with an outwardly offset depending internally threaded flange 50 defining a downwardly directed retaining shoulder 52 which engages and clamps the dosing component lip 40 against the container rim 42 upon a threading of the flange 50 to the externally threaded neck 26 of the container 14, thus completing the mounting of the dispensing assembly. To avoid any external projections along the side wall of the assembly, as well as for aesthetic purposes, the outer annular surface of the flange 50 can be slightly upwardly and outwardly flared, corresponding to the flare of the container portion 28.

The flexible membrane 46, which is relatively stiff so as to retain itself and the spout 44 in the two adjusted positions thereof as shall be explained presently, includes inner and outer annular integral living hinges or hinge portions 54 and 56 respectively adjacent the spout 44 and collar 48 to enhance the flexibility of the membrane 46.

The two positions of the membrane 46, and hence the spout 44, will be noted in FIGS. 2 and 5. In FIG. 2, the membrane 46 is outwardly flexed or domed in an overcenter position which retains the position until manually moved therefrom. In this first position the lower or intake end 60 of the spout is aligned with or slightly above the spider or openwork support system 34 whereby, upon an inverting of the container, the contents thereof will freely flow from the container storage chamber 22 through the openings 38 and through the inlet end 60 of the spout 44 for a continuous dispensing from the remote outlet end of the spout.

Noting FIG. 5, upon an inward flexing of the membrane 46, through a manual downward pressure on the membrane 46 itself or the spout 44, the membrane 46 snaps overcenter to its second downwardly concave position wherein the lower inlet end 60 of the spout is below the mouth of the dosing cup 32 a distance beyond the flaring surrounding lip of this cup mouth sufficient to prevent direct flow from the chamber 22 into the inlet end of the spout. In this position, upon an inverting of the container 14, only the flowable material within the dosing cup 32, or at least that portion of material aligned with the intake end 60, should the spout 44 be slightly diametrically smaller than the cup 32, will be dispensed through the spout 44. There will be no continuous flow from the main chamber 22 of the container. Rather, upon an inverting of the container adjusted as in FIG. 5, the main chamber material will merely flow to the membrane end and through the openings to the level of the outer edge of the cup mouth or lip thereabout. It is contemplated that this area accommodates sufficient material so that, upon a reinverting of the container, or an upright positioning thereof, the flowable material so collected will appropriately refill the dosing cup 32 for the dispensing of a second measured dose.

As will be appreciated from a comparison of FIGS. 1 and 6, the position of the membrane 46 will be readily apparent from a viewing of the top of the dispenser, and will provide an immediate indication as to whether the dispenser is in the pouring position or the dosing position. Further, as will be appreciated from FIG. 2, the overcap 12 will seal the upper end of the container and dispensing assembly in either of the dispensing positions of the spout 44. As will also be appreciated from the detailed cross-section of FIG. 3, it is contemplated that the overcap be snap-locked and frictionally engaged to the collar 48 of the spout cap 18 by interengaging minor enlargements or lugs 62 and 64 provided respectively peripherally about the collar 48 and peripherally about the inner face of the overcap 12 at the lower edge thereof which in turn rests on the defined shoulder immediately below the collar 48 and above the internally threaded flange 50.

It is contemplated that, in the dosing position of FIG. 5, the area volume above the dosing cup 32 be such so as to ensure an appropriate dose of material within the cup 32 without bringing the level thereof higher than the inwardly offset inlet end 60 of the spout 44 so as to normally avoid the necessity, in moving the spout 44 to its dosing position, of forcing the spout into the material. As previously indicated, assuming a sugar dispenser, it is preferred that the size of the dosing cup 32 be so adjusted, relative to the spout, as to provide for the dispensing of an amount of sugar equal to approximately a standard sugar cube.

In order to fill the container, one need merely unscrew the spout cap 18, lift out the insert 16, and pour the material, whether sugar, chocolate granules, milk powder, or the like, into the container to the preferred level, preferably at the lowermost position of the dosing cup 32. The dispensing components are then quickly assembled and the dispenser ready for use.

For pouring, the spout is manually pulled upward with the membrane snap-locking into its outer domed position, and a free pouring of the contents is possible.

For dosing, the spout is pushed inward with the membrane, again snap-locking into its concave position. The container is then turned upside down, and then right side up to fill the cup 32. A single dose can then be dispensed by again turning the container over with this action, following by a rerighting of the container, again automatically filling the dose cup.

It is contemplated that all of the components of the dispenser preferably be made of appropriate non-food contaminating synthetic resinous materials. It is also to be appreciated that the term granular is used in a generic sense to include flowable solids, including granules such as regular sugar, powders such as powdered sugar, and the like.

The foregoing is considered illustrative of the principals of the invention. As variations incorporating the inventive features may occur to those skilled in the art, for example differences in the configuration of the container, all suitable variations as fall within the scope of the claims, may be resorted to.

I claim:

1. A dispenser for selective continuous pour and single dose dispensing of granular material, said dispenser comprising a container, said container defining an internal storage chamber, a dispensing spout having one inner inlet end inwardly directed toward said chamber, and an outer outlet end exterior of said container, a dose cup mounted within said chamber and having a discharge mouth aligned with and opening toward said spout, means for mounting said spout on said container for selective movement between a first continuous pour position and a second dose position, said inlet end of said spout, in said first position of said spout, being in outwardly spaced relation to said dose cup discharge mouth with a continuous flow path for granular material formed exterior of said cup from said chamber to said inlet end, said inlet end of said spout, in said second position of said spout, being in said cup inward of said mouth thereof forming a flow path for granular material to said inlet end solely from said cup, and precluding flow of granular material from said chamber to said inlet end.

2. The dispenser of claim 1 wherein said means for mounting said spout comprises a flexible membrane fixed to said spout and extending radially outward therefrom, said membrane terminating in an outer periphery fixed to said container, said membrane, in said first position of said spout being outwardly directed relative to said container, said membrane in said second position of said spout being inwardly directed relative to said container.

3. The dispenser of claim 2 wherein said container includes a mouth therein communicating with said internal storage container, said dose cup being positioned inward of said container mouth, said membrane overlying said container mouth with said spout aligned with said cup, and releasable mounting means for fixing said membrane to said container about said mouth.

4. The dispenser of claim 3 wherein said membrane includes integral hinge means adjacent said spout and said means for fixing said membrane to said container.

5. The dispenser of claim 4 wherein said spout extends coaxially through said membrane and extends laterally beyond both sides thereof.

6. The dispenser of claim 5 including an overcap releasably mounted over said membrane and spout in both said first and said second positions thereof.

7. The dispenser of claim 6 including an openwork structure integral with said dose cup and extending therefrom to engage said container at said container mouth for suspension of said dose cup within said container chamber below said mouth, said openwork structure including openings therethrough allowing free flow of material therethrough.

8. The dispenser of claim 7 wherein said spout, in said first outer position thereof, having said inner inlet end aligning with said openwork structure for free flow of material through said openwork structure and said spout.

9. The dispenser of claim 8 wherein said spout inner end in said second position inward of said mouth of said cup is inward of said openwork structure to allow flow only from said cup.

10. The dispenser of claim 9 wherein said container includes a rim surrounding and defining said mouth, said openwork structure having an outer periphery overlying said container rim and clamped thereto by said means mounting said membrane to said container.

11. The dispenser of claim 10 wherein said container chamber has a maximum fill level, said dose cup being positioned above said maximum fill level.

12. The dispenser of claim 3 including an openwork structure integral with said dose cup and extending therefrom to engage said container at said container mouth for suspension of said dose cup within said container chamber below said mouth, said openwork structure including openings therethrough allowing free flow of material therethrough.

13. The dispenser of claim 12 wherein said spout, in said first outer position thereof, having said inner inlet end aligning with said openwork structure for free flow of material through said openwork structure and said spout.

14. The dispenser of claim 13 wherein said spout inner end in said second position inward of said mouth of said cup is inward of said openwork structure to allow flow only from said cup.

15. A dispensing assembly for a container having a rim-defining open mouth therein, said dispensing assembly including an upwardly opening dose cup with an openwork structure extending upwardly and outwardly therefrom peripherally thereabout and defining multiple openings for the passage of flowable material, said openwork structure terminating in an upper peripheral lip adapted to overlie said container rim, and a spout cap overlying said dose cup and openwork structure, said spout cap including an elongate spout generally axially aligned with said cup in spaced relation thereto, a flexible membrane engaged with said spout peripherally thereabout and extending generally radially therefrom to overlie said openwork structure lip, said membrane being flexible to longitudinally move said spout relatively toward and away from said cup, said spout having an inner intake end which, in a first move position of said membrane, is received within said cup, and in a second move position of said membrane, is positioned above said cup and in general alignment with said openwork structure, said membrane being configured to releasably lock in both of said positions.

16. The dispensing assembly of claim 15 wherein said spout cap includes means for releasably locking said spout cap and said open work structure, with dose cap, to said container at said rim of said container.

* * * * *